Oct. 24, 1961     C. J. LUCIA ET AL     3,005,302
ROTARY CUTTER

Original Filed Sept. 29, 1958     4 Sheets-Sheet 1

*INVENTORS*
CARROLL J. LUCIA.
BY    IRA MAXON.

ATTORNEY

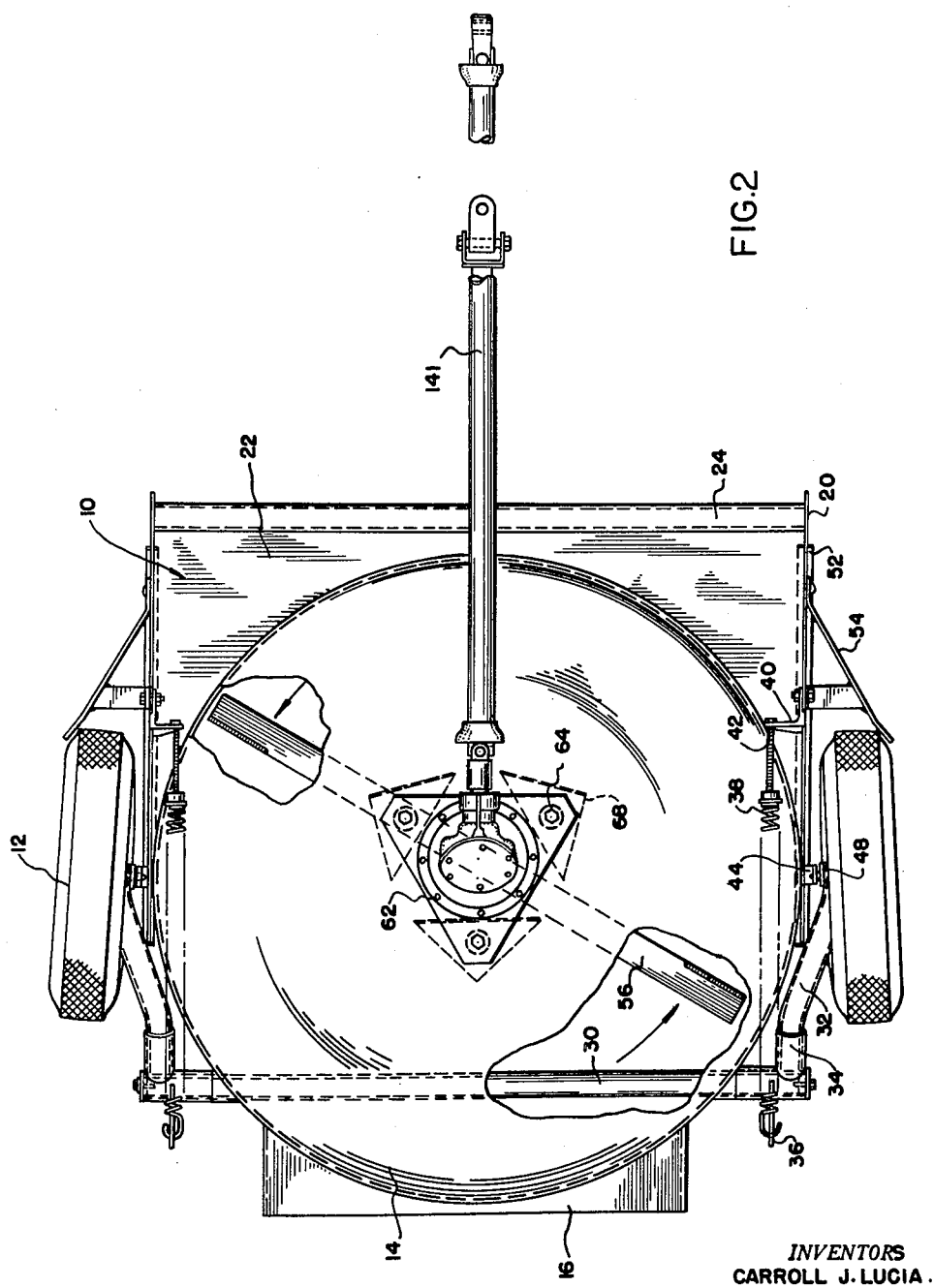

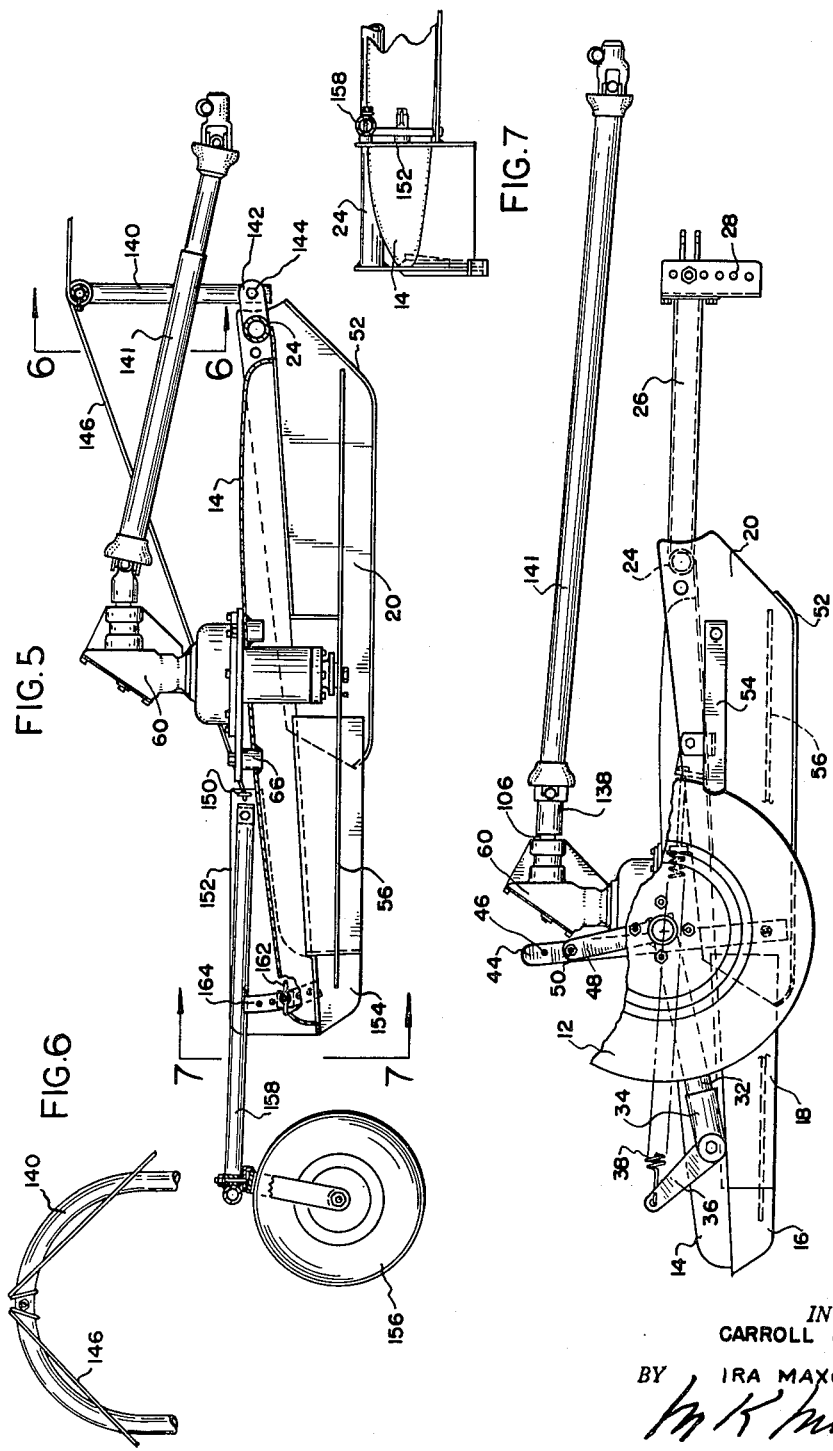

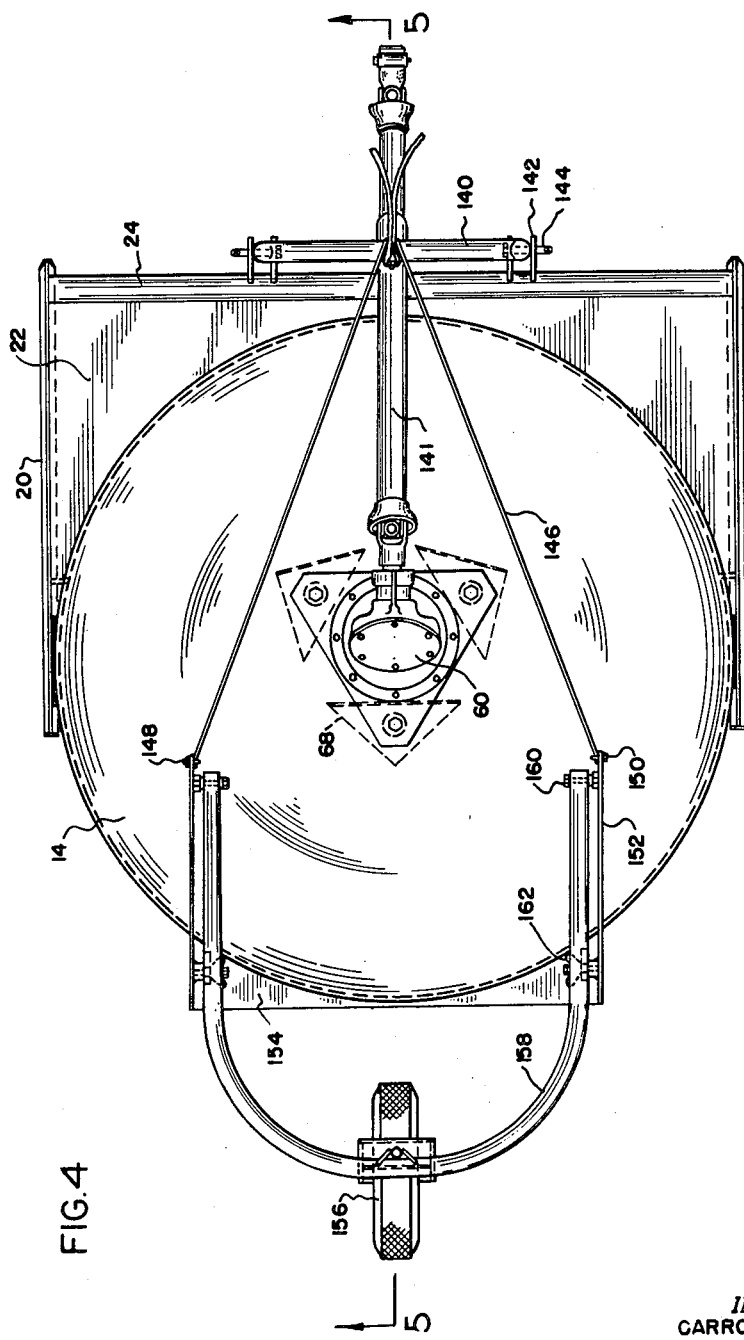

United States Patent Office 3,005,302
Patented Oct. 24, 1961

3,005,302
ROTARY CUTTER
Carroll J. Lucia, Pontiac, and Ira Maxon, Southfield Township, Mich., assignors to Dura Corporation, a corporation of Michigan
Original application Sept. 29, 1958, Ser. No. 763,853. Divided and this application June 26, 1959, Ser. No. 823,182
2 Claims. (Cl. 56—25.4)

This invention relates to rotary cutters and shredders, and is a division of application Serial No. 763,853, filed September 29, 1958.

During recent years, rotary cutters or rotary mowers, as they are sometimes called, have been used increasingly for agricultural mowing and for clearing land of grass, weeds, small saplings, undergrowth, etc. Use of such machines for cutting over land where there is a growth of alders, small saplings, etc., has imposed tremendous loads on the cutter bar and on the power transmission mechanism which has caused excessive wear and in many instances failure of the drive train.

The object of our invention is to provide an improved rotary cutter having means for eliminating, at least partially, the bending strains imposed on the cutter housing and on the transmission gearbox by the blade encountering fixed objects on the ground, such as stumps, etc.

Still another object is to provide a rotary cutter having a relatively open or enlarged "throat" whereby the ability of the machine to cut high brush, small saplings and weeds is improved.

Other objects and advantages of our invention will be apparent from the following specification which, taken in conjunction with the accompanying drawings, discloses preferred embodiments of the invention.

In the drawings, in which reference characters have been used to designate like parts referred to in the following description:

FIG. 2 is a plan view of the cutter shown in FIG. 1 with parts broken away;

FIG. 3 is a side elevation thereof with parts broken away to show details;

FIG. 4 is a plan view of a modified form of rotary cutter of the type known as the three point hitch type;

FIG. 5 is a horizontal sectional view taken along line 5—5 of FIG. 4; and

Figure 1:
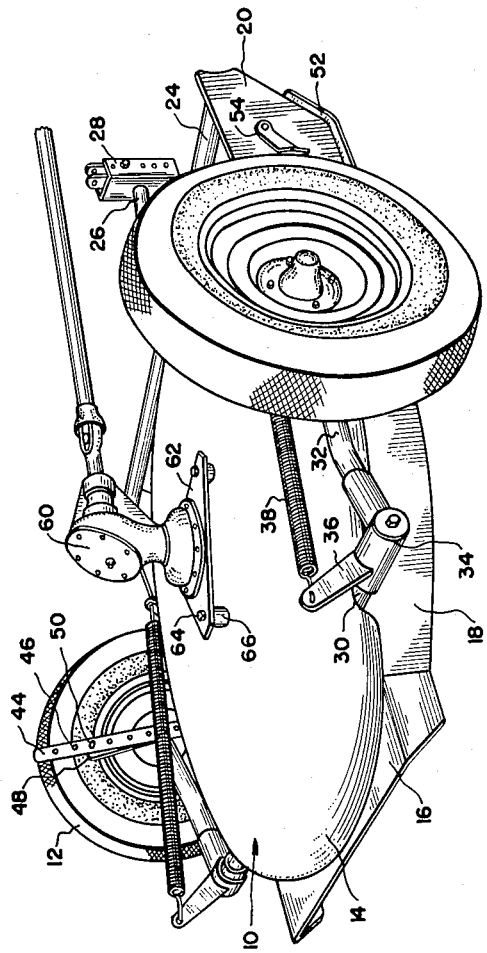
FIG. 1 is a perspective view of a trailer type rotary cutter embodying the features of our invention.

FIGS. 6 and 7 are fragmentary detail views taken along lines 6—6 and 7—7 respectively of FIG. 5.

Referring now particularly to FIGS. 1-3 inclusive, it may be seen that the improved rotary cutter comprises a main frame or body 10 supported by wheels 12. The body 10 consists of a deck 14, to which is welded or otherwise secured, a delivery chute 16, a pair of side skirt members 18, a pair of side members 20 and a throat member 22. A rigid bar 24 extends across the forward portion of the body. This bar 24 is suitably secured at each end thereof to the adjacent side member 20 and at its central portion mounts a draw bar 26 which carries a hitch 28 for attachment to a tractor towing bracket (not shown).

The deck 14 is of annular concave shape and is made preferably of a steel tank end. Manufacturers of storage and pressure tanks for liquids and gases stock such tank ends in various sizes and gauges and we have found these parts to be ideally suited for the purpose shown and described herein. The chute 16, skirts 18, side pieces 20 and throat 22, are likewise of steel, and these parts are firmly welded to the deck in such manner that an extremely rugged frame well suited for support of the cutter knife, power transmission, etc., results.

A second rigid bar 30 is welded to the deck and skirts near the rear of the cutter. This bar strengthens the rear portion of the assembly and serves as a dead axle for the wheel mounting arms 32. The wheels 12 are mounted respectively on the outer ends of the arms 32 by means of conventional stub axles. The inner ends of arms 32 are swingably mounted on the protruding ends of the bar 30 by means of elbow members 34.

As can be seen in FIGS. 1–3, each elbow 34 has a transversely extending portion rotatably mounted on the bar 30 and a forwardly extending portion which is rigidly secured to the wheel arm 32 by welding, press fit or the like. Each transverse portion carries an upwardly extending arm 36. The respective arms 36 are connected by counterbalance springs 38 with brackets 40 carried by the side members 20. The latter are of fairly deep section and extend above the plane of the throat 22 as may be seen from the drawing. Adjusting screws 42 are provided to adjust the force of the balance springs.

The balance springs 38 tend to force the wheel arms 32 downwardly and thus lift the cutter body off the ground, but this yieldable suspension is for height adjustment only and not for suspending the cutter body during use as will be presently made clear.

Each side piece 20 carries an upright member 44 (see FIG. 3 particularly) provided with a plurality of holes 46. Each wheel arm 32 carries an upright member 48 which extends at approximately a 90° angle to the wheel arm and is secured to the latter at the mounting point of the wheel stub axle. The uprights 48 each have a hardened pin 50 secured at their upper ends.

The pins 50 are adapted to engage the holes 46 of the uprights 44 and thus fix the positions of the wheels 12 with respect to the body 10 of the cutter. By changing the positions of the pins 50 in the holes 46, the height of the body 10 above the ground (and thus the cutting height) may be adjusted. If the cutter is being operated along a side-hill, one wheel 12 may be adjusted to a different relative position than the opposite wheel and thus compensate for the slope of the surface being cut.

Adjustment of the wheel heights is easily accomplished by means of our novel counterbalanced wheel mounting. The members 44 are of spring steel and because of their relatively long length may be easily bent inwardly of the assembly to disengage the pins 50 from the holes 46. Once this is done, the particular wheel arm 32 on the side being adjusted is free to swing about the axis of the axle bar 30 restrained only by the spring 38. It is then a simple matter to raise or depress the cutter body with respect to that wheel until the desired adjustment in relative height is obtained, then permit the upright 44 to spring back to its normal position with the pin 50 engaged in the proper hole 46. Because the weight of the cutter assembly is counterbalanced by the spring 38, little effort is required to raise or depress the cutter body and thus the cutting height may be adjusted for cutting or for transport in minimum time with minimum effort.

The side pieces 20 also carry runners 52 for engaging the ground during close cutting or when cutting over uneven terrain, and fenders 54 for protecting the tires from engagement with obstacles.

A plurality of reinforcing plates (FIG. 2) are welded to the underside of the deck in the areas of the holes for the bolts 64 to increase the strength of the deck section at these points, the deck itself being somewhat flexible at its central portion for beneficial reasons as will be explained below.

The power transmission assembly 60 comprises a lower housing securely welded to the plate 62 and an upper housing detachably secured to the plate by bolts 64. The upper housing consists of two housing portions welded together.

As stated above, the deck 14 of the rotary cutter comprises a tank-end which is formed of disced, thin steel, flanged at its marginal edge. The thickness of the deck for a cutter like that illustrated is normally one-eighth inch. As a result, the deck is somewhat flexible, particularly at its center. This is advantageous because it permits the transmission 60 to wobble slightly where the blade 56 hits solid objects and thus absorb some of the sudden shock which sometimes causes rupture of solid inflexible decks.

As is apparent from FIG. 3, the deck 14 is inclined upwardly toward the front of the cutter assembly, although the cutter blade 56 is horizontal. This opens the "throat" of the cutter and subjects the material being cut to the action of the blade with less bending at the cutting plane, which increases the cutting efficiency.

Reference is now made in FIGS. 4 to 7 inclusive, in which parts similar to those described above have been given the same reference numerals. These figures show a rotary cutter embodying our invention but adapted to be mounted on tractors having the so called "three-point hitch" which is well known in the art.

This cutter is hitched to the towing vehicle through a hitch structure which includes a yoke 140. This yoke is vertically mounted on the cross bar 24 which carries two sets of forwardly extending arms 142 welded thereon. The yoke 140 is pivotally attached to these arms by pins 144. The pins 144 are adapted to be engaged by the tractor hitch arms (not shown), and a flexible cable 146 is looped around the central portion of the yoke and fastened at 148, 150, to the upwardly extending flanges 152 of the discharge chute 154. The forward end of cable 146 is adapted for attachment to a fixed point on the tractor.

The drawing shows a single trailer wheel 156 attached to the flanges 152 by means of a horizontally disposed yoke 158. This wheel is preferably a caster wheel and may be used or not as desired. The wheel and mounting yoke may be readily removed by removing the nuts 160, 162. When used to support the rear end of the cutter, the wheel 156 is adjustable in height by means of the punched straps 164 as is apparent from FIG. 5.

Removal of the wing nut 162 permits the strap 164 carried by the yoke 158 to be adjusted upwardly or downwardly by engaging the proper hole in the strap 164 with the bolt carried by flange 152 on which nut 162 is threaded.

The rotary cutter of FIG. 5 is mounted on the tractor by engaging the tractor lift arms with the pins 144 and attaching the cable 146 to a fixed point on the tractor.

The tractor lift arms are movable vertically by power, and thus the entire cutter assembly is vertically adjustable for varying the cutting height or for transport.

The cable 146 supports the rear portion of the assembly such that elevation of the pins 144 by the tractor lift arms results in the entire cutter assembly being lifted vertically. On the other hand, the cable 146 offers no restriction whatsoever to pivoting of the assembly about the axis of the pins 144, so the cutter assembly may readily follow the ground contour. This is true whether or not caster wheel 156 is used. The mounting frees the tractor and cutter frame from the stresses resulting from contact of the frame with the ground when mowing over rough terrain as is the case with conventional hitches which utilize a rigid link for the upper connection.

While we have shown and described only two of the many forms that our invention might assume, it will be understood that such has been done for illustrative purposes and not by way of limitation.

We claim:
1. In a rotary cutter, in combination, a frame comprising a dished annular deck member having a downwardly turned marginal flange, longitudinally extending, rigid side members fixed to said deck member at each side thereof, said side members extending downwardly and forwardly with respect to the marginal flange of said deck member, a laterally extending throat member fixed to said side members and to said deck member forwardly of said deck member, said deck member and said throat member being disposed in coplanar relationship with the plane thereof inclined upwardly and forwardly with respect to said side members to provide an enlarged throat opening for receiving growth to be cut, a rigid cross bar fixed to said side members and to said throat member at the forward ends thereof, and a rotatable cutter blade mounted on and below the central portion of said deck member for rotation in a plane parallel to and above the lower edges of said side members.

2. The combination set forth in claim 1 wherein the deck member is of relatively light gauge metal sufficient to permit limited movement of the blade mounting on said vertical axis for absorbing shock loads on said blade.

References Cited in the file of this patent

UNITED STATES PATENTS

| | | |
|---|---|---|
| 2,815,631 | Northcote | Dec. 10, 1957 |
| 2,821,831 | Thompson | Feb. 4, 1958 |
| 2,862,343 | Wood | Dec. 2, 1958 |
| 2,867,963 | Lawrence et al. | Jan. 13, 1959 |
| 2,888,796 | Denny | June 2, 1959 |
| 2,891,369 | Rietz | June 23, 1959 |